(12) United States Patent
Turtinen et al.

(10) Patent No.: US 12,323,936 B2
(45) Date of Patent: Jun. 3, 2025

(54) HANDLING TAT EXPIRY OF MULTIPLE TAGS

(71) Applicant: NOKIA TECHNOLOGIES OY, Espoo (FI)

(72) Inventors: Samuli Heikki Turtinen, Ii (FI); Chunli Wu, Beijing (CN); Matha Deghel, Montrouge (FR); Timo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/921,614

(22) Filed: Oct. 21, 2024

(65) Prior Publication Data
US 2025/0048299 A1 Feb. 6, 2025

Related U.S. Application Data

(63) Continuation of application No. PCT/CN2023/086683, filed on Apr. 6, 2023.

(51) Int. Cl.
*H04W 56/00* (2009.01)
*H04W 74/0808* (2024.01)
*H04W 74/0833* (2024.01)

(52) U.S. Cl.
CPC ... *H04W 56/0045* (2013.01); *H04W 74/0808* (2013.01); *H04W 74/0833* (2013.01)

(58) Field of Classification Search
None
See application file for complete search history.

(56) References Cited

U.S. PATENT DOCUMENTS

2020/0221436 A1* 7/2020 Jang .................... H04W 56/001
2021/0068157 A1* 3/2021 Auslender ......... H04W 56/0045
(Continued)

FOREIGN PATENT DOCUMENTS

CN 110351824 A 10/2019
CN 115696550 A 2/2023

OTHER PUBLICATIONS

International Search Report and Written Opinion dated Dec. 18, 2023 corresponding to International Patent Application No. PCT/CN2023/086683.
(Continued)

*Primary Examiner* — Jutai Kao
(74) *Attorney, Agent, or Firm* — SQUIRE PATTON BOGGS (US) LLP (57) ABSTRACT

Example embodiments of the present disclosure provide a solution for handling expiry of at least one time alignment timer (TAT) of multiple timing advance groups (TAGs) associated with a serving cell. In an example method, the terminal device receives determines at least two TAGs for a serving cell, wherein the at least two TAGs comprise a primary TAG and a secondary TAG. The terminal device determines whether at least one TAT of the at least two TAGs has expired and maintain, based on determining that the at least one TAT has expired, one of the primary TAG and the secondary TAG. In this way, only a single TAG is maintained once the terminal device has single TAT/no TAT running removing ambiguities in RA procedure/UL signal transmissions. Since the network is aware of the TAT expiry, it knows behaviour of the terminal device and can act accordingly.

18 Claims, 4 Drawing Sheets

(56) References Cited

U.S. PATENT DOCUMENTS

| | | |
|---|---|---|
| 2021/0345414 A1 | 11/2021 | Agiwal |
| 2023/0413139 A1* | 12/2023 | Xu ...................... H04W 74/006 |
| 2024/0172017 A1* | 5/2024 | Wu ....................... H04W 24/10 |
| 2024/0205854 A1* | 6/2024 | Guo .................. H04W 56/0045 |
| 2024/0250798 A1* | 7/2024 | Agiwal ................ H04B 7/0639 |
| 2024/0323881 A1* | 9/2024 | Agiwal ............. H04W 74/0833 |

OTHER PUBLICATIONS

Potevio, "SRS configuration and TAT handling for sTAG," R2-115813, 3GPP TSG-RAN WG2 Meeting #76, San Francisco, USA, Nov. 14-18, 2011, Nov. 18, 2011.

* cited by examiner

HANDLING TAT EXPIRY OF MULTIPLE TAGS

CROSS-REFERENCE TO RELATED APPLICATION

This application is a Continuation of International Patent Application No PCT/CN2023/086683, filed Apr. 6, 2023, the contents of which are hereby incorporated by reference in their entirety.

FIELD

Example embodiments of the present disclosure generally relate to the field of communication, and in particular, to a terminal device, a network device, methods, apparatuses, and a computer readable medium for handling expiry of at least one time alignment timer (TAT) of multiple timing advance groups (TAGs) associated with a serving cell.

BACKGROUND

In New Radio (NR) systems, the concept and functionality of NR timing advance (TA) is substantially same as the long term evolution (LTE) timing advance. Briefly, TA is a special command (e.g. notification) from a network device to a terminal device that enables the terminal device to adjust its uplink transmission. This kind of uplink adjustment may apply to physical uplink shared channel (PUSCH), physical uplink control channel (PUCCH), sounding reference signal (SRS) and etc.

In 3GPP release-18, it was agreed to support two-TA enhancement for uplink (UL) multi-downlink control information (DCI) for multi-Transmission and reception point (TRP) operation. However, solutions regarding multiple TAs need to be further studied.

SUMMARY

In general, example embodiments of the present disclosure provide solutions for handling multiple timing advance values for user equipment (UE) within a serving cell.

In a first aspect, there is provided a terminal device. The terminal device comprises at least one processor and at least one memory storing instructions that, when executed by the at least one processor, cause the terminal device at least to: determine at least two timing advance groups (TAGs) for a serving cell, wherein the at least two TAGs comprise a primary TAG and a secondary TAG; determine whether at least one time alignment timer (TAT) of the at least two TAGs has expired; and maintain, based on determining that the at least one TAT has expired, one of the primary TAG and the secondary TAG.

In a second aspect, there is provided a network device. The network device comprises: at least one processor; and at least one memory storing instructions that, when executed by the at least one processor, cause the network device at least to: determine at least two timing advance groups (TAGs) for a serving cell, wherein the at least two TAGs comprise a primary TAG and a secondary TAG; determine whether at least one time alignment timer (TAT) of the at least two TAGs has expired; and determine, based on determining that the at least one TAT has expired, one of the primary TAG and the secondary TAG to be maintained at a terminal device.

In a third aspect, there is provided a method. The method comprises: determining, at a terminal device, at least two timing advance groups (TAGs) for a serving cell, wherein the at least two TAGs comprise a primary TAG and a secondary TAG; determining whether at least one time alignment timer (TAT) of the at least two TAGs has expired; and maintaining, based on determining that the at least one TAT has expired, one of the primary TAG and the secondary TAG.

In a fourth aspect, there is provided a method. The method comprises: determining, at a network device, at least two timing advance groups (TAGs) for a serving cell, wherein the at least two TAGs comprise a primary TAG and a secondary TAG; determining whether at least one time alignment timer (TAT) of the at least two TAGs has expired; and determining, based on determining that the at least one TAT has expired, one of the primary TAG and the secondary TAG to be maintained at a terminal device.

In a fifth aspect, there is provided an apparatus. The apparatus comprises: means for determining, at a terminal device, at least two timing advance groups (TAGs) for a serving cell, wherein the at least two TAGs comprise a primary TAG and a secondary TAG; means for determining whether at least one time alignment timer (TAT) of the at least two TAGS has expired; and means for maintaining, based on determining that the at least one TAT has expired, one of the primary TAG and the secondary TAG.

In a sixth aspect, there is provided an apparatus. The apparatus comprises: means for determining, at a network device, at least two timing advance groups (TAGs) for a serving cell, wherein the at least two TAGs comprise a primary TAG and a secondary TAG; means for determining whether at least one time alignment timer (TAT) of the at least two TAGs has expired; and means for determining, based on determining that the at least one TAT has expired, one of the primary TAG and the secondary TAG to be maintained at a terminal device.

In a seventh aspect, there is provided a non-transitory computer-readable storage medium comprising program instructions. The program instructions, when executed by an apparatus, cause the apparatus to perform at least the following: determining at least two timing advance groups (TAGs) for a serving cell, wherein the at least two TAGs comprise a primary TAG and a secondary TAG; determining whether at least one time alignment timer (TAT) of the at least two TAGs has expired; and maintaining, based on determining that the at least one TAT has expired, one of the primary TAG and the secondary TAG.

In an eighth aspect, there is provided a non-transitory computer-readable storage medium comprising program instructions. The program instructions, when executed by an apparatus, cause the apparatus to perform at least the following: determining at least two timing advance groups (TAGs) for a serving cell, wherein the at least two TAGs comprise a primary TAG and a secondary TAG; determining whether at least one time alignment timer (TAT) of the at least two TAGs has expired; and determining, based on determining that the at least one TAT has expired, one of the primary TAG and the secondary TAG to be maintained at a terminal device.

In a ninth aspect, there is provided a computer program comprising instructions, which, when executed by an apparatus, cause the apparatus at least to: determine at least two timing advance groups (TAGs) for a serving cell, wherein the at least two TAGs comprise a primary TAG and a secondary TAG; determine whether at least one time alignment timer (TAT) of the at least two TAGs has expired; and maintain, based on determining that the at least one TAT has expired, one of the primary TAG and the secondary TAG.

In a tenth aspect, there is provided a computer program comprising instructions, which, when executed by an apparatus, cause the apparatus at least to: determine at least two timing advance groups (TAGs) for a serving cell, wherein the at least two TAGs comprise a primary TAG and a secondary TAG; determine whether at least one time alignment timer (TAT) of the at least two TAGs has expired; and determine, based on determining that the at least one TAT has expired, one of the primary TAG and the secondary TAG to be maintained at a terminal device.

In an eleventh aspect, there is provided a terminal device. The terminal device comprises: a first circuitry configured to determine at least two timing advance groups (TAGs) for a serving cell, wherein the at least two TAGs comprise a primary TAG and a secondary TAG; a second circuitry configured to determine whether at least one time alignment timer (TAT) of the at least two TAGs has expired; and a third circuitry configured to maintain, based on determining that the at least one TAT has expired, one of the primary TAG and the secondary TAG.

In a twelfth aspect, there is provided a network device. The network device comprises: a first circuitry configured to determine at least two timing advance groups (TAGs) for a serving cell, wherein the at least two TAGs comprise a primary TAG and a secondary TAG; a second circuitry configured to determine whether at least one time alignment timer (TAT) of the at least two TAGs has expired; and a third circuitry configured to determine, based on determining that the at least one TAT has expired, one of the primary TAG and the secondary TAG to be maintained at a terminal device.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory (ies) that work together to cause an apparatus, such as a mobile phone or server, to perform various functions) and
(c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "network", "communication network" or "data network" refers to a network following any suitable communication standards, such as long term evolution (LTE), LTE-advanced (LTE-A), wideband code division multiple access (WCDMA), high-speed packet access (HSPA), narrow band Internet of things (NB-IoT), wireless fidelity (Wi-Fi) and so on. Furthermore, the communications between a terminal device and a network device/element in the communication network may be performed according to any suitable generation communication protocols, including, but not limited to, the fourth generation (4G), 4.5G, the future fifth generation (5G), IEEE 802.11 communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP) or a transmission and reception point (TRP), for example, a node B (NodeB or NB), an evolved NodeB (eNodeB or eNB), a NR NB (also referred to as a gNB), a remote radio unit (RRU), a radio header (RH), a remote radio head (RRH), a WiFi device, a relay, a low power node such as a femto, a pico, and so forth, depending on the applied terminology and technology. In the following description, the terms "network device", "AP device", "AP" and "access point" may be used interchangeably.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), a station (STA) or station device, or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "station", "station device", "STA", "terminal device", "communication device", "terminal", "user equipment" and "UE" may be used interchangeably.

As used herein, the term "TRP" refers to a transmit-receive point having an antenna array (with one or more antenna elements) at the network side located at a specific geographical location, which may be used for transmitting and receiving signals to/from the terminal device. In embodiment of the present disclosure, a TRP may refer to Macro Cell, micro cell, an RRH, a relay, a femto node, a pico node, etc. Although some embodiments of the present disclosure are described with reference to two TRPs for example, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

As discussed above, TA is a special command (e.g. notification) from a network device to a terminal device that enables the terminal device to adjust its uplink transmission. TA is a special command (e.g. notification) from the network device to the terminal device that enables the terminal device to adjust its uplink transmission.

TA can be delivered to a terminal device through random access response (RAR) or MAC CE (medium access control element). A TA loop can be used to maintain the TA to enable alignment of UL signals (transmitted from a terminal device) at a network node within a certain time resolution. In a random access procedure, the terminal device may receive an initial TA value (e.g., an absolute TA value) in a RAR message. The TA value may then be updated with a MAC CE containing a timing advance command (TAC) indicating a relative TA value. In addition, the UE may also autonomously update the TA by initiatively request an updated TA value. These operations of maintain the TA is called as a TA loop. Usually, a TA loop may correspond to UL transmissions toward a given TRP. In addition, a TA loop may correspond to TA maintained within a TAG. Therefore, one TA loop may correspond to one TA and the number of TA loops may indicate the number of used TAs. Thus, in the present disclosure, a TA loop may refer to a TA implicitly.

A timing advance group (TAG) used herein means a group consists of one or more serving cells with the same uplink TA and same downlink timing reference cell. Each TAG contains at least one serving cell with configured uplink, and the mapping of each serving cell to a TAG is configured by a radio resource control (RRC) signal. In 3GPP release 18, it was already agreed to support, in NR system, two TAs for UL multi-DCI for multi-TRP operation. In addition, the support of two TA enhancement has been agreed for both intra-cell and inter-cell multi-DCI multi-TRP scenarios in 3GPP release 18. Multiple (two or more) timing advance values for a UE within a serving cell is under discussion for further new (NR) enhancement.

Since in the multi-TRP scenario, the UE could have 2 TAGs for a serving cell (like SpCell), these TAGs would naturally employ different time alignment timers (TATs) for the network (NW) to be able to provide separate timing adjustment commands using, e.g., TAC MAC CE, and hence, the TATs may be (re-)started in different times for these two TAGs.

While the UE in RRC_CONNECTED mode is configured with 2 TA-loops/TAGs for a serving Cell, and more specifically for an SpCell (PCell/PSCell), the TATs associated with the TAGs may expire at different times. One of the TAGs associated with SpCell may be considered to be a primary TAG and one may be considered as a secondary TAG. It is not clear what is the UE behaviour upon expiry of both or one of these timers.

According to embodiments of the present disclosure, there is providing a solution for multiple TAGs handling upon TAT expiry associated with a serving cell. The UE may have at least two TAGs for a serving cell comprising a primary TAG and a secondary TAG. When at least one of the TATs of the serving cell (e.g. SpCell) expires, the UE keeps only the primary TAG. Which one is the primary TAG of the cell group/the SpCell could be pre-configured, or the TAG with TAT still running could become the primary TAG if only one TAT expires for the TAGs of the SpCell. In this way, only a single TAG is maintained once the UE has single TAT/no TAT running removing ambiguities in RA procedure/UL signal transmissions. Since the NW is aware of the TAT expiry, it knows the UE behaviour and can act accordingly.

For illustrative purposes, principle and example embodiments of the present disclosure will be described below with reference to FIG. 1 to FIG. 6. However, it is to be noted that these embodiments are given to enable the skilled in the art to understand inventive concepts of the present disclosure and implement the solution as proposed herein, and not intended to limit scope of the present application in any way.

Figure 1:
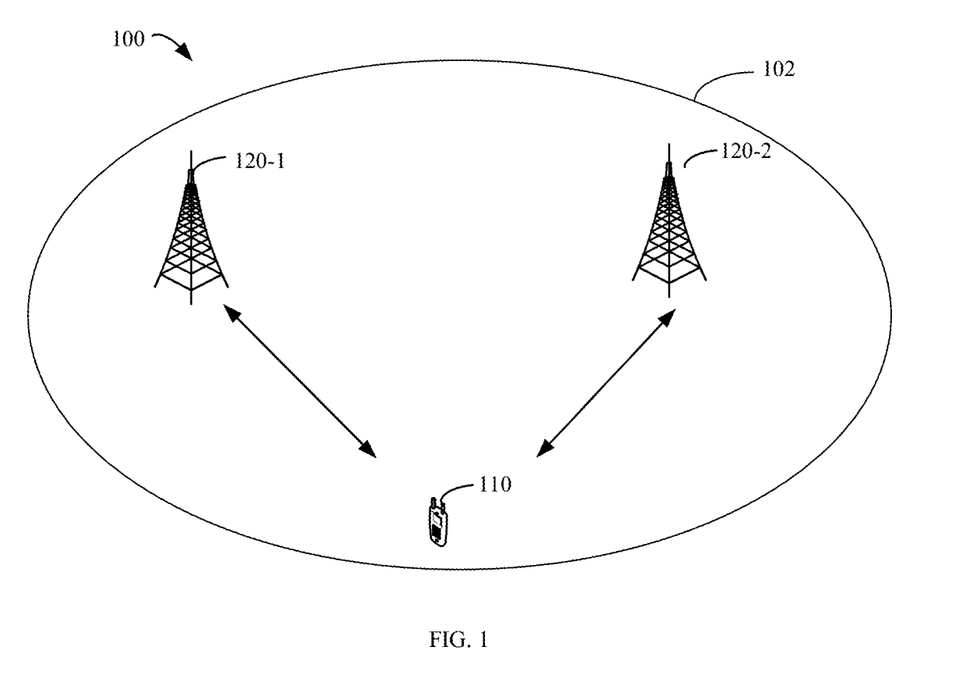
FIG. 1 illustrates an example communication network in which embodiments of the present disclosure may be implemented.

FIG. 1 illustrates an example of a communication network 100 in which some example embodiments of the present disclosure may be implemented. As illustrated in FIG. 1, the communication network 100 includes a terminal device (which may also be referred to as user equipment or UE) 110 and two network devices (which may also be referred to as a gNB or BS), such as TRP 120-1 and 120-2 (collectively "120"). Although one terminal devices 110 and two network devices 120 are shown in FIG. 1, the numbers of the network device and the terminal device are not limited. In other words, there may be one or more network devices 110 and one or more terminal devices 120 in the network.

The network devices 120 can provide services to the terminal device 110, and the network devices 120 and the terminal device 110 may communicate data and control information with each other. In some embodiments, the network devices 120 and the terminal device 110 may communicate with direct links/channels.

In the communication system 100, a link from the network devices 120 to the terminal device 110 is referred to as a downlink (DL), while a link from the terminal device 110 to the network device 120 is referred to as an uplink (UL). In downlink, the network devices 120 are transmitting (TX) devices (or transmitters) and the terminal device 110 is a receiving (RX) device (or a receiver). In uplink, the terminal device 110 is a transmitting (TX) device (or a transmitter) and the network devices 120 are RX devices (or receivers). It is to be understood that the network devices 120 may provide one or more serving cells. As illustrated in FIG. 1, the network devices 120 together provide a serving cell 102, and the terminal device 110 camps on the serving cell 102. In some embodiments, the network device 120 can provide multiple serving cells and the terminal device 120 may switch from a source cell to a target cell between the serving cells during its mobility. It is to be understood that the number of serving cell(s) shown in FIG. 1 is for illustrative purposes without suggesting any limitation.

Communications in the network environment 100 may be implemented according to any proper communication protocol(s), comprising, but not limited to, cellular communication protocols of the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In some embodiments, the serving cell 102 may comprise a primary cell, a primary secondary cell, or a secondary cell with multiple network devices 120, such as TRPs. As mentioned, the terminal device 110 may have two TAGs for the serving cell 102 and employ different TATs for one of the network devices to be able to provide separate TACs for the TAGs. The terminal device 110 may determine one of the TAGs is a primary TAG and the other is a secondary TAG. Upon expiry of one or more TATs expires, the terminal device 110 may keep one of the primary TAG and the secondary TAG. The network device 120 which provides the TAC is also aware of the TAT expiry. It knows which TAG is kept at the terminal device 110, and may act accordingly.

It is to be understood that the number of devices and their connection relationships and types shown in FIG. 1 are for illustrative purposes without suggesting any limitation. The communication system 100 may comprise any suitable number of devices adapted for implementing embodiments of the present disclosure.

Figure 2:
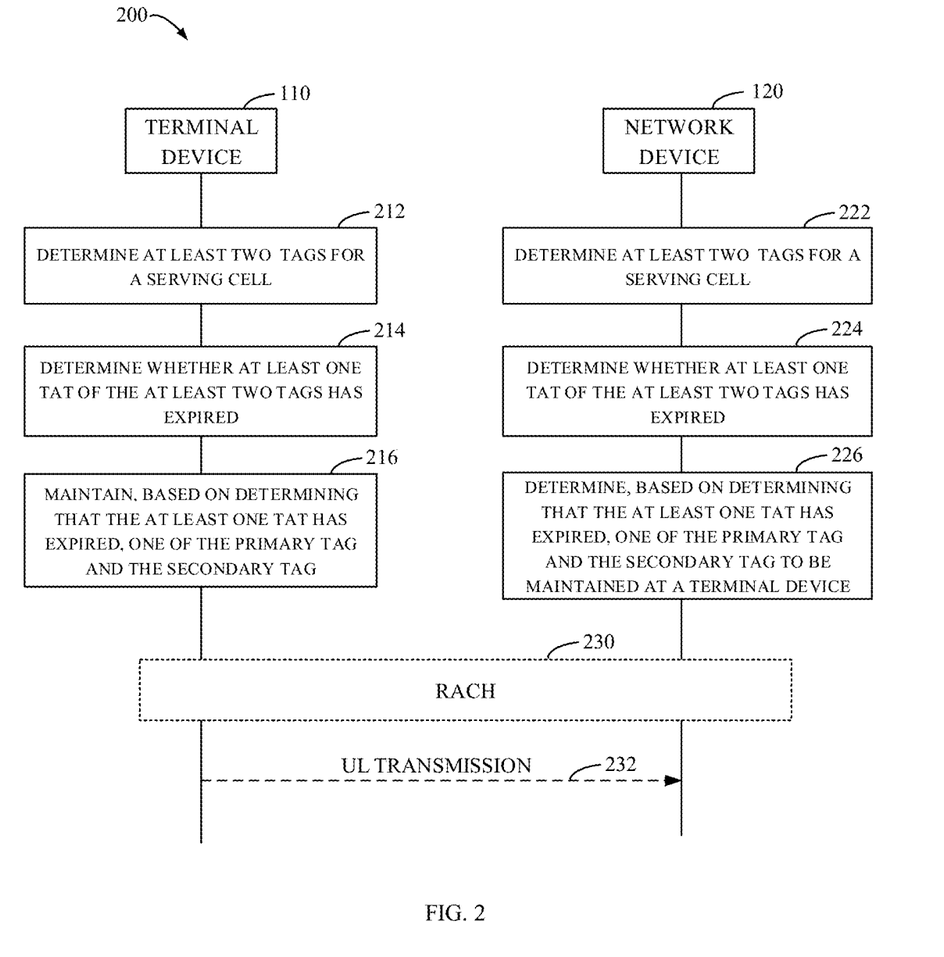
FIG. 2 illustrates an example of a process flow in accordance with some example embodiments of the present disclosure.

FIG. 2 illustrates an example of a process flow in accordance with some example embodiments of the present disclosure. For ease of understanding, the process flow 200 will be described with reference to FIG. 1. It would be appreciated that although the process flow 200 has been described referring to the communication network 100 of FIG. 1, this process flow 200 may be likewise applied to other similar communication scenarios.

At block 212, the terminal device 110 determines at least two timing advance groups (TAGs) for a serving cell. In some embodiments, the serving cell may comprise a primary cell, a primary secondary cell, or a secondary cell. In some embodiments, the serving cell may be a special cell (SpCell, ie., either PCell or PSCell). The serving cell may provide services with multiple network devices 120 (such as TRPs). One of the network devices 120 (hereafter, network device 120) may be configured to provide control signals to the terminal device 110.

The at least two TAGs may comprise a primary TAG and a secondary TAG. Which one is the primary TAG of the cell group/the SpCell could be pre-configured, or the TAG with TAT still running could become the primary TAG if only one TAT expires for the TAGs of the SpCell.

In some embodiments, the terminal device may determine one of the at least two TAGs to be the primary TAG based on a configuration indicative of the primary TAG. The terminal device 110 may receive a RRC connection reconfiguration or other control signals from the network device 120 indicative the primary TAG. For example, a TAG with a lower TAG identity (TAG ID) may be specified as the primary TAG. In some examples, the primary TAG is always associated with SpCell (ie., PCell or PSCell).

The roles of the primary TAG and secondary TAG may exchange if the configured primary TAG becomes invalid. In some embodiments, the terminal device 110 may determine the configured primary TAG to be secondary if the corresponding TAT expires and the configured secondary TAG to be primary if the TAT is still running.

At block 214, the terminal device 110 determines whether at least one time alignment timer (TAT) of the at least two TAGs has expired. The expiry of the TAT means the terminal device 110 is not in synchronization with the network device 120, and the TA value of the corresponding TAG becomes invalid. In some embodiments, the terminal device 110 and the network device 120 may be required to perform a random access (RACH) procedure for synchronization, where a new TAC is to be transmitted from the network device 120 to the terminal device 110. However, in some cases, the network device does not explicitly indicate the TAG ID for the new TAC.

At block 216, the terminal device 110 maintains, based on determining that the at least one TAT has expired, one of the primary TAG and the secondary TAG. By maintaining one TAG, the network device 120 and terminal device 110 can remove the ambiguities in the RACH procedure and UL signal transmissions.

In some embodiments, the terminal device 110 may release a secondary TAG configuration associated with the secondary TAG. The terminal device may release the secondary TAG configuration upon expiry of both of the TATs associated with TAGs of SpCell; upon expiry of the TAT associated with the primary TAG; or upon expiry of the TAT associated with either of the TAGs associated with the SpCell after which the other one with TAT still running becomes the primary TAG. In some examples, the terminal device 110 may release the secondary TAG configuration only from the SpCell (ie., PCell or PSCell) or the part of the secondary TAG configuration associated with the SpCell. In some examples, when the secondary TAG includes serving cells other than SpCell (e.g., one or more secondary cells), the terminal device 110 retains the secondary TAG configuration for the serving cells other than the SpCell.

In some embodiments, the terminal device 110 release the secondary TAG configuration upon the expiry of TATs associated with the at least two TAGs. Additionally or alternatively, the terminal device 110 may release the secondary TAG configuration upon the expiry of a TAT associated with the primary TAG. Additionally or alternatively, the terminal device 110 may release the secondary TAG configuration upon the expiry of a TAT associated with the primary TAG or upon expiry of a TAT associated with the secondary TAG.

In some embodiments, the terminal device 110 may release PUCCH resources associated with the secondary TAG. Additionally or alternatively, the terminal device 110 may release sounding reference signal (SRS) resources associated with the secondary TAG. Additionally or alternatively, the terminal device 110 may clear configured downlink assignments and configured uplink grants associated with the secondary TAG. Additionally or alternatively, the terminal device 110 may clear PUSCH resources for semi-persistent channel state information (CSI) reporting associated with the secondary TAG.

In some embodiments, the terminal device 110 may deactivate each of the spatial relations for any UL signals (e.g., PUCCH, SRS, PUSCH, etc.) associated with the TAG upon TAT expiry or upon releasing the secondary TAG configuration. In some embodiments, if the terminal device 110 does not have any active spatial relation for a PUCCH resource after the TAT expiry in SpCell, the terminal device 110 considers all TATs as expired.

The network device 120 has acts corresponding to the terminal device 110. At block 222, the network device 120 determines at least two TAGs for a serving cell. The at least two TAGs comprise a primary TAG and a secondary TAG that correspond to the TAGs at the terminal device 110. The network device 120 may transmit control signals to the terminal device 110 indicative of which TAG is the primary TAG, for example, a TAG with a lower TAG ID. In addition, the network device 120 is also aware of the expiry of the TATs of the primary TAG and the secondary TAG, and may determine the secondary TAG to become a new primary TAG if the TAT of the original primary TAG.

At block 224, the network device 120 determines whether at least one time alignment timer (TAT) of the at least two TAGs has expired. The network device 120 employs TATs to determine whether the terminal device 110 is in synchronization. If a TAT of the TAGs expires, the network device 120 knows the TA value of the corresponding TAG becomes invalid. In this case, the network device 120 will perform a RACH procedure and transmit a new TAC to the terminal device.

At block 226, the network device 120 determines, based on determining that the at least one TAT has expired, one of the primary TAG and the secondary TAG to be maintained at a terminal device. As such, the network device 120 is aware of the TAT expiry, it knows the behavior of terminal device 110 and can act accordingly.

At 230, the terminal device 110 and the network device 230 may perform a RACH procedure where a TAC is transmitted in a random access response (RAR) from the network device 120 to the terminal device 110. The RACH procedure may be triggered by the terminal device 110 using PRACH preamble or by the network device 120 using PDCCH order.

Thereafter, upon receiving TAC in RAR, the terminal device 110 applies the TAC for primary TAG no matter which SSB was selected for random access in case RA procedure is triggered at the terminal device and in case none of the TATs is running. Based on determining that the RACH procedure is triggered at the terminal device 110 or determining that the at least one TAT of the at least two TAGs has expired, the terminal device 110 may apply the TAC to the primary TAG.

In some embodiments, when the PDCCH order for RACH procedure is triggered for the terminal device 110 and the target DL RS is associated with specific TAG ID, the terminal device 110 may associate the TAG ID of the TCI state used to schedule PDCCH order with the primary TAG. Implicitly, if the terminal device 110 is indicated with the second/another TCI state, the terminal device 110 may be associated the TAG ID of the TCI state (if different with the TAG ID of the primary TAG) with the secondary TAG. In some embodiments, the TAG ID may be associated with the TCI state used for transmitting the PDCCH order for RACH or with the TAG ID corresponding to the PCI indicated in the PDCCH order.

In some embodiments, the terminal device 110 may be configured to to store the primary TAG and the secondary TAG association with TAG IDs (of different TCI States) and the respective TA values. In some embodiments, the random access response provided for the RA preamble transmission may include indication whether the terminal device can apply the stored values of the primary TAG and secondary TAG association and the TA values. If the network triggers PDCCH order associated with the TCI state for the secondary TAG and receives in the response a TAC that carries indication to apply the stored value of the TA and the associated TAG ID, the terminal device may determine to apply the previous configuration. If the response does not include the information, the terminal device may assume the TAC applied to the TAG ID associated with the TCI state and associated the TAG ID with the primary TAG.

At 232, the terminal device may perform a UL transmission. In some embodiments, the UE may use the beam for UL transmissions used for PRACH preamble transmission until transmission configuration information (TCI) state update has been received from the network (e.g., through RRC reconfiguration or MAC CE).

In view of the above, it can be seen that only a single TAG is maintained once the terminal device has single TAT/no TAT running, removing ambiguities in RA procedure/UL signal transmissions. Since the NW is aware of the TAT expiry, it knows the behaviour of the terminal device and can act accordingly.

Figure 3:
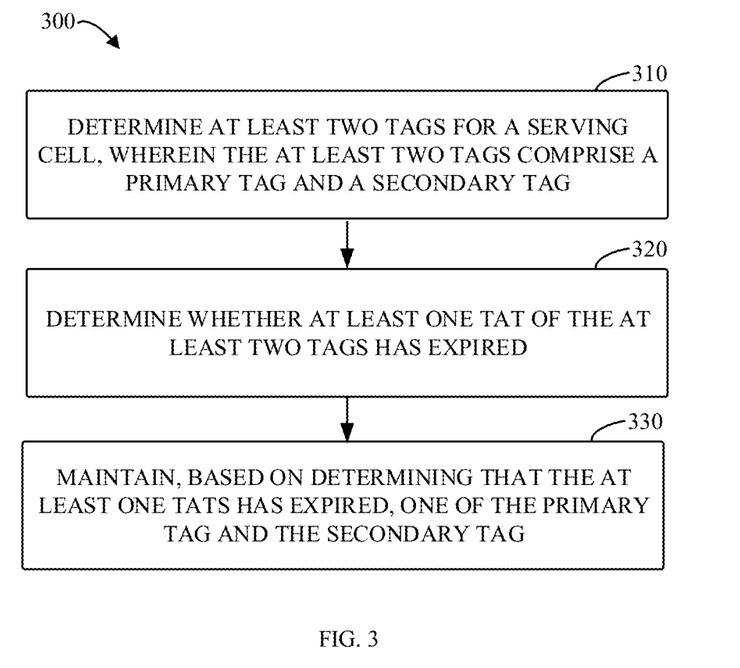
FIG. 3 illustrates a flowchart of an example method implemented at a terminal device in accordance with some embodiments of the present disclosure.

FIG. 3 illustrates a flowchart of an example method 300 implemented at a terminal device in accordance with some other embodiments of the present disclosure. For ease of understanding, the method 300 will be described from the perspective of the terminal device 110 with reference to FIG. 1.

At block 310, the terminal device 110 determines at least two TAGs for a serving cell, wherein the at least two TAGs comprise a primary TAG and a secondary TAG. The terminal device 110 may determine one of the TAGs to be the primary TAG based on a configuration indicative of the primary TAG. Additionally or alternatively, based on determining that a TAT of the primary TAG has expired, the terminal device 110 may determine the secondary TAG with a running TAT to be primary.

At block 320, the terminal device 110 determines whether at least one TAT of the at least two TAGs has expired. The terminal device 110 may employ a TAT for each TAG, and detecting whether the TAT has expired. Upon detecting expiry of the TAT, the terminal device 110 knows it is out of synchronization for the corresponding TAG ID. In some embodiments, the serving cell may comprise a primary cell, a primary secondary cell, or a secondary cell with multiple TRPs.

At block 330, the terminal device 110 maintains, based on determining that the at least one TAT has expired, one of the primary TAG and the secondary TAG. In some embodiments, the terminal device 110 may release a secondary TAG configuration associated with the secondary TAG. The secondary TAG configuration may be released on expiry of TATs associated with the at least two TAGs. Additionally or alternatively, the secondary TAG configuration may be released upon expiry of either of a TAT associated with the primary TAG or a TAT associated with the secondary TAG.

In some embodiments, the terminal device 110 may release physical uplink control channel (PUCCH) resources associated with the secondary TAG. Additionally or alternatively, the terminal device 110 may release sounding reference signal (SRS) resources associated with the secondary TAG. Additionally or alternatively, the terminal device 110 may clear configured downlink assignments and configured uplink grants associated with the secondary TAG. Additionally or alternatively, the terminal device 110 may clear physical uplink shared channel (PUSCH) resources for semi-persistent channel state information (CSI) reporting associated with the secondary TAG.

In some embodiments, the terminal device 110 may deactivate a spatial relation for an uplink (UL) signal associated with the secondary TAG. Thus, the spatial relation associated with the secondary TAG is suspended.

In some embodiments, the terminal device 110 may receive a timing advance command (TAC) in a random access response (RAR) of a random access channel (RACH) procedure. Based on determining that the RACH procedure is triggered at the terminal device or determining that the at least one TAT of the at least two TAGs has expired, the terminal device 110 may apply the TAC to the primary TAG.

In some embodiments, the terminal device 110 may apply a beam for UL transmission used for physical random access channel (PRACH) preamble transmission until reception of a transmission configuration indicator (TCI) state update, wherein the UL transmission has a timing advance indicated in the TAC.

In some embodiments, the terminal device 110 may store a first TAG ID and a first TA value in association with the primary TAG and store a second TAG ID and a second TA value in association with the secondary TAG. In some embodiments, one or more of the first TAG ID and the second TAG ID may be associated with a PDCCH order for an RACH procedure triggered for the terminal device 110. Additionally or alternatively, one or more of the first TAG ID and the second TAG ID may be associated with a PCI indicated in the PDCCH order. Additionally or alternatively, one or more of the first TAG ID and the second TAG ID may be associated with a TCI state used for transmitting the PDCCH order.

In some embodiments, the terminal device 110 may receive an RAR provided for a preamble transmission of the PDCCH order. The terminal device 110 may apply, based on the received RAR, one of the first TA value associated with the primary TAG and the second TA value associated with the secondary TA.

In some embodiments, the terminal device 110 may apply the second TA value associated with the secondary TAG based on determining that the RAR includes an indication to the secondary TAG. The terminal device 110 may apply the first TA value associated with the primary TAG based on determining that the RAR does not include the indication to the secondary TAG.

Figure 4:
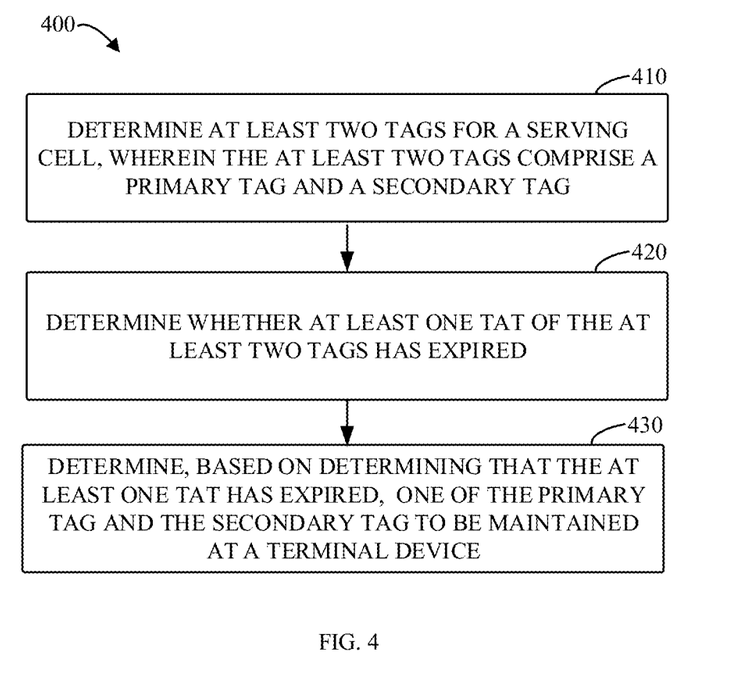
FIG. 4 illustrates another flowchart of an example method implemented at a network device in accordance with some embodiments of the present disclosure.

FIG. 4 illustrates another flowchart of an example method implemented at a network device in accordance with some embodiments of the present disclosure. For case of understanding, the method 400 will be described from the perspective of the terminal device 120 with reference to FIG. 1.

At block 410, the network device 120 determines at least two TAGs for a serving cell, wherein the at least two TAGs comprise a primary TAG and a secondary TAG. At block 420, the network device 120 determines whether at least one TAT of the at least two TAGs has expired. At block 430, the network device 120 determines, based on determining that the at least one TAT has expired, one of the primary TAG and the secondary TAG to be maintained at a terminal device. In some embodiments, the serving cell may comprise a primary cell, a primary secondary cell, or a secondary cell with multiple TRPs.

In some embodiments, the network device 120 may store a first TAG ID and a first TA value in association with the primary TAG and store a second TAG ID and a second TA value in association with the secondary TAG.

In some embodiments, one or more of the first TAG ID and the second TAG ID may be associated with a PDCCH order for an RACH procedure triggered for the terminal device 110. Additionally or alternatively, one or more of the first TAG ID and the second TAG ID may be associated with a PCI indicated in the PDCCH order. Additionally or alternatively, one or more of the first TAG ID and the second TAG ID may be associated with a TCI state used for transmitting the PDCCH order.

In some embodiments, the network device 120 may transmit an RAR provided for a preamble transmission of the PDCCH order to the terminal device. The RAR may include an indication to whether the primary TAG or the secondary TAG is to be applied at the terminal device.

In some embodiments, an apparatus capable of performing the method 300 (for example, the terminal device 110) may comprise means for performing the respective steps of the method 300. The means may be implemented in any suitable form. For example, the means may be implemented in a circuitry or software module.

In some example embodiments, the apparatus comprises: means for determining at least two timing advance groups (TAGs) for a serving cell, wherein the at least two TAGs comprise a primary TAG and a secondary TAG; means for determining whether at least one time alignment timer (TAT) of the at least two TAGs has expired; and means for maintaining, based on determining that the at least one TAT has expired, one of the primary TAG and the secondary TAG.

In some embodiments, the apparatus may comprise means for determining the primary TAG of the at least two TAGs based on at least one of the following: a configuration indicative of the primary TAG; or based on determining that a TAT of the primary TAG has expired, determining the secondary TAG with a running TAT to be primary.

In some embodiments, the apparatus may comprise means for releasing a secondary TAG configuration associated with the secondary TAG.

In some embodiments, means for releasing a secondary TAG configuration may comprise means for releasing a secondary TAG based on at least one of the following: expiry of TATs associated with the at least two TAGs; expiry of a TAT associated with the primary TAG; or expiry of a TAT associated with the secondary TAG.

In some embodiments, means for releasing a secondary TAG configuration may comprise means for releasing physical uplink control channel (PUCCH) resources associated with the secondary TAG; means for releasing sounding reference signal (SRS) resources associated with the secondary TAG; means for clearing configured downlink assignments and configured uplink grants associated with the secondary TAG; and means for clearing physical uplink shared channel (PUSCH) resources for semi-persistent channel state information (CSI) reporting associated with the secondary TAG.

In some embodiments, the apparatus may comprise means for deactivating a spatial relation for an uplink (UL) signal associated with the secondary TAG.

In some embodiments, the apparatus may comprise means for receiving a timing advance command (TAC) in a random access response (RAR) of a random access channel (RACH) procedure; and means for applying, based on determining that the RACH procedure is triggered at the terminal device or determining that the at least one TAT of the at least two TAGs has expired, the TAC to the primary TAG.

In some embodiments, the apparatus may comprise means for applying a beam for UL transmission used for physical random access channel (PRACH) preamble transmission until reception of a transmission configuration indicator (TCI) state update, wherein the UL transmission has a timing advance indicated in the TAC.

In some embodiments, the apparatus may comprise means for storing a first TAG ID and a first TA value in association with the primary TAG and means for storing a second TAG ID and a second TA value in association with the secondary TAG.

In some embodiments, at least one of the first TAG ID and the second TAG ID is associated with at least one of: a physical downlink control channel (PDCCH) order for an RACH procedure triggered for the terminal device; a physical cell identity (PCI) indicated in the PDCCH order; or a transmission configuration indicator (TCI) state used for transmitting the PDCCH order.

In some embodiments, the apparatus may comprise means for receiving an RAR provided for a preamble transmission of the PDCCH order and means for applying, based on the received RAR, one of the first TA value associated with the primary TAG and the second TA value associated with the secondary TAG.

In some embodiments, the apparatus may comprise: means for applying, based on determining that the RAR includes an indication to the secondary TAG, the second TA value associated with the secondary TAG, and means for applying, based on determining that the RAR does not include the indication to the secondary TAG, the first TA value associated with the primary TAG.

In some embodiments, the serving cell comprises a primary cell, a primary secondary cell, or a secondary cell with multiple transmission and reception points (TRPs).

In some embodiments, the apparatus further comprises means for performing other steps in some embodiments of the method 300. In some embodiments, the means comprises at least one processor and at least one memory including computer program code, the at least one memory and computer program code configured to, with the at least one processor, cause the performance of the apparatus.

In some embodiments, an apparatus capable of performing the method 400 (for example, the network device 120) may comprise means for performing the respective steps of the method 400. The means may be implemented in any suitable form. For example, the means may be implemented in a circuitry or software module.

In some embodiments, the apparatus may comprise: means for determining at least two timing advance groups (TAGs) for a serving cell, wherein the at least two TAGs comprise a primary TAG and a secondary TAG; means for determining whether at least one time alignment timer (TAT) of the at least two TAGs has expired; and means for determining, based on determining that the at least one TAT has expired, one of the primary TAG and the secondary TAG to be maintained at a terminal device.

In some embodiments, the apparatus may comprise means for determining the primary TAG based on at least one of the following: a configuration indicative of the primary TAG; or based on determining that a TAT of the primary TAG has expired, determining the secondary TAG with a running TAT to be primary.

In some embodiments, the apparatus may comprise means for storing a first TAG ID and a first TA value in association with the primary TAG and means for storing a second TAG ID and a second TA value in association with the secondary TAG.

In some embodiments, at least one of the first TAG ID and the second TAG ID is associated with at least one of: a physical downlink control channel (PDCCH) order for an RACH procedure triggered for the terminal device; a physical cell identity (PCI) indicated in the PDCCH order; or a transmission configuration indicator (TCI) state used for transmitting the PDCCH order.

In some embodiments, the apparatus may comprise means for transmitting an RAR provided for a preamble transmission of the PDCCH order to the terminal device, wherein the RAR includes an indication to whether the primary TAG or the secondary TAG is to be applied at the terminal device.

In some embodiments, the serving cell comprises a primary cell, a primary secondary cell, or a secondary cell with multiple transmission and reception points (TRPs).

In some embodiments, the apparatus further comprises means for performing other steps in some embodiments of the method 400. In some embodiments, the means comprises at least one processor and at least one memory including computer program code, the at least one memory and computer program code configured to, with the at least one processor, cause the performance of the apparatus.

Figure 5:
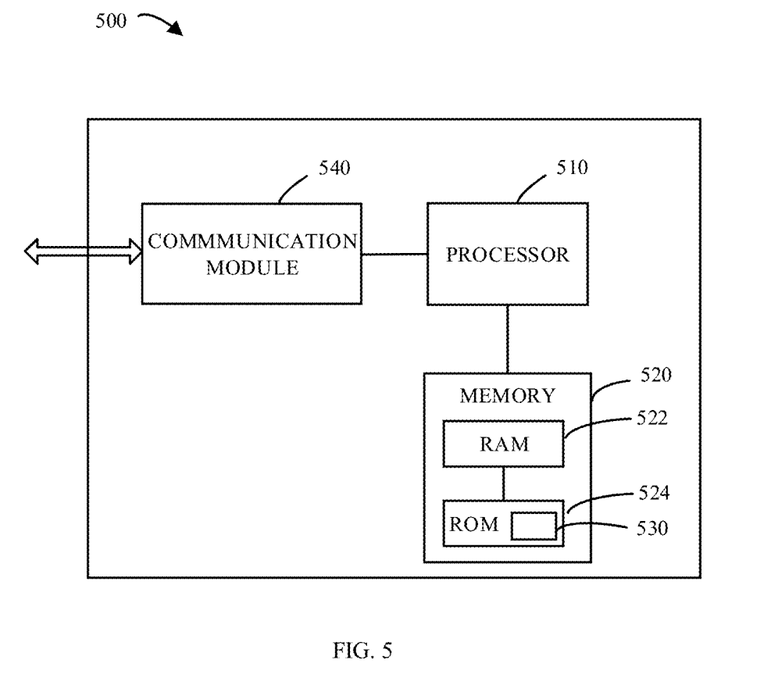
FIG. 5 illustrates a simplified block diagram of a device that is suitable for implementing some example embodiments of the present disclosure.

FIG. 5 illustrates a simplified block diagram of a device 500 that is suitable for implementing some example embodiments of the present disclosure. The device 500 may be provided to implement a communication device, for example, the network device 120 or the terminal device 110 as shown in FIG. 1. As shown, the device 500 includes one or more processors 510, one or more memories 520 coupled to the processor 510, and one or more communication modules 540 coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The embodiments of the present disclosure may be implemented by means of the program 530 so that the device 500 may perform any process of the disclosure as discussed with reference to FIGS. 3 and 4. The embodiments of the present disclosure may also be implemented by hardware or by a combination of software and hardware.

In some example embodiments, the program 530 may be tangibly contained in a computer-readable medium which may be included in the device 500 (such as in the memory 520) or other storage devices that are accessible by the device 500. The device 500 may load the program 530 from the computer-readable medium to the RAM 522 for execution. The computer-readable medium may include any types of tangible non-volatile storage, such as ROM, EPROM, a flash memory, a hard disk, CD, DVD, and the like.

Figure 6:
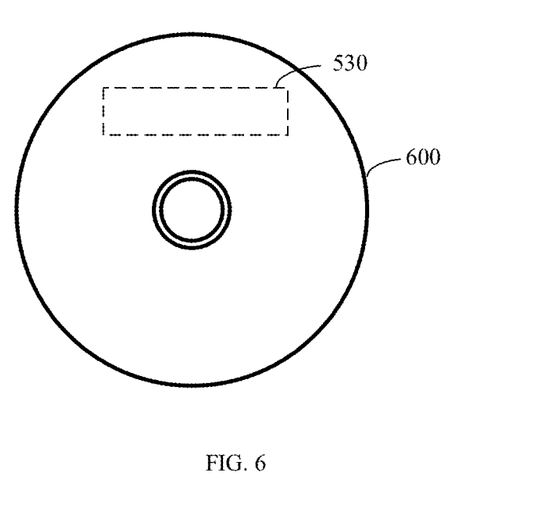
FIG. 6 illustrates a block diagram of an example of a computer-readable medium in accordance with some example embodiments of the present disclosure.

FIG. 6 illustrates a block diagram of an example of a computer-readable medium 600 in accordance with some example embodiments of the present disclosure. The computer-readable medium 600 has the program 530 stored thereon. It is noted that although the computer-readable medium 600 is depicted in form of CD or DVD in FIG. 5, the computer-readable medium 600 may be in any other form suitable for carry or hold the program 530.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer-readable storage medium. The computer program product includes computer-executable instructions, such as those included in program modules, being executed in a device on a target real or virtual processor, to carry out the method 300 or 400 as described above with reference to FIG. 3 or 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer-readable medium, and the like.

The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
at least one processor; and
at least one memory storing instructions that, when executed by the at least one processor, cause the terminal device at least to:
determine at least two timing advance groups (TAGs) for a serving cell, wherein the at least two TAGs comprise a primary TAG and a secondary TAG;
determine whether at least one time alignment timer (TAT) of the at least two TAGs has expired;
maintain, based on determining that the at least one TAT has expired, one of the primary TAG and the secondary TAG;
receive a timing advance command (TAC) in a random access response (RAR) of a random access channel (RACH) procedure; and
based on determining that the at least one TAT of the at least two TAGs has expired,
apply the TAC to the primary TAG, and
apply a beam for UL transmission used for physical random access channel (PRACH) preamble transmission until reception of a transmission configuration indicator (TCI) state update, wherein the UL transmission has a timing advance indicated in the TAC.

2. The terminal device of claim 1, wherein the terminal device is further caused to determine the primary TAG of the at least two TAGs based on at least one of the following:
a configuration indicative of the primary TAG; or
based on determining that a TAT of the primary TAG has expired, determining the secondary TAG with a running TAT to be primary.

3. The terminal device of claim 1, wherein the terminal device is further caused to:
release a secondary TAG configuration associated with the secondary TAG.

4. The terminal device of claim 3, wherein the terminal device is further caused to release the secondary TAG configuration based on at least one of the following:
expiry of TATs associated with the at least two TAGs;
expiry of a TAT associated with the primary TAG; or
expiry of a TAT associated with the secondary TAG.

5. The terminal device of claim 3, wherein the terminal device is further caused to release the secondary TAG configuration by at least one of the following:
releasing physical uplink control channel (PUCCH) resources associated with the secondary TAG;
releasing sounding reference signal (SRS) resources associated with the secondary TAG;
clearing configured downlink assignments and configured uplink grants associated with the secondary TAG; or
clearing physical uplink shared channel (PUSCH) resources for semi-persistent channel state information (CSI) reporting associated with the secondary TAG.

6. The terminal device of claim 1, wherein the terminal device is further caused to:
deactivate a spatial relation for an uplink (UL) signal associated with the secondary TAG.

7. The terminal device of claim 1, wherein the terminal device is further caused to:
store a first TAG ID and a first timing advance (TA) value in association with the primary TAG; and
store a second TAG ID and a second TA value in association with the secondary TAG.

8. The terminal device of claim 7, wherein at least one of the first TAG ID and the second TAG ID is associated with at least one of:
a physical downlink control channel (PDCCH) order for an RACH procedure triggered for the terminal device;
a physical cell identity (PCI) indicated in the PDCCH order; or
a transmission configuration indicator (TCI) state used for transmitting the PDCCH order.

9. The terminal device of claim 8, wherein the terminal device is further caused to:
receive an RAR provided for a preamble transmission of the PDCCH order; and
apply, based on the received RAR, one of the first TA value associated with the primary TAG and the second TA value associated with the secondary TAG.

10. The terminal device of claim 9, wherein the terminal device is further caused to:
based on determining that the RAR includes an indication to the secondary TAG, apply the second TA value associated with the secondary TAG, and
based on determining that the RAR does not include the indication to the secondary TAG, apply the first TA value associated with the primary TAG.

11. The terminal device of claim 1, wherein the serving cell comprises a primary cell, a primary secondary cell, or a secondary cell with multiple transmission and reception points (TRPs).

12. A network device, comprising:
at least one processor; and at least one memory storing instructions that, when executed by the at least one processor, cause the network device at least to:

determine at least two timing advance groups (TAGs) for a serving cell, wherein the at least two TAGs comprise a primary TAG and a secondary TAG;

determine whether at least one time alignment timer (TAT) of the at least two TAGs has expired, wherein when the at least one TAT of the at least two TAGs has expired, a timing advance command (TAC) is applied to the primary TAG;

determine, based on determining that the at least one TAT has expired, one of the primary TAG and the secondary TAG to be maintained at a terminal device;

transmit, to a terminal device, the timing advance command (TAC) in a random access response (RAR) of a random access channel (RACH) procedure; and receive, from the terminal device when the at least one TAT of the at least two TAGs has expired, a beam for UL transmission used for physical random access channel (PRACH) preamble transmission until transmission of a transmission configuration indicator (TCI) state update, wherein the UL transmission has a timing advance indicated in the TAC.

13. The network device of claim 12, wherein the network device is further caused to determine the primary TAG based on at least one of the following:

a configuration indicative of the primary TAG; or based on determining that a TAT of the primary TAG has expired, determining the secondary TAG with a running TAT to be primary.

14. The network device of claim 12, wherein the network device is further caused to:

store a first TAG ID and a first timing advance (TA) value in association with the primary TAG; and store a second TAG ID and a second TA value in association with the secondary TAG.

15. The network device of claim 14, wherein at least one of the first TAG ID and the second TAG ID is associated with:

a physical downlink control channel (PDCCH) order for an RACH procedure triggered at the network device;

a physical cell identity (PCI) indicated in the PDCCH order, or a transmission configuration indicator (TCI) state used for transmitting the PDCCH order.

16. The network device of claim 15, wherein the network device is further caused to:

transmit an RAR provided for a preamble transmission of the PDCCH order to the terminal device, wherein the RAR includes an indication to whether the primary TAG or the secondary TAG is to be applied at the terminal device.

17. The network device of claim 12, wherein the serving cell comprises a primary cell, a primary secondary cell, or a secondary cell with multiple transmission and reception points (TRPs).

18. A method, comprising:

determining at least two timing advance groups (TAGs) for a serving cell, wherein the at least two TAGs comprise a primary TAG and a secondary TAG;

determining whether at least one time alignment timer (TAT) of the at least two TAGs has expired;

maintaining, based on determining that the at least one TAT has expired, one of the primary TAG and the secondary TAG;

receiving a timing advance command (TAC) in a random access response (RAR) of a random access channel (RACH) procedure; and based on or determining that the at least one TAT of the at least two TAGs has expired, applying the TAC to the primary TAG, and applying a beam for UL transmission used for physical random access channel (PRACH) preamble transmission until reception of a transmission configuration indicator (TCI) state update, wherein the UL transmission has a timing advance indicated in the TAC.

* * * * *